United States Patent
Choi

(10) Patent No.: US 12,059,969 B2
(45) Date of Patent: Aug. 13, 2024

(54) CHARGING SYSTEM FOR VEHICLE

(71) Applicants: Hyundai Motor Company, Seoul (KR); Kia Corporation, Seoul (KR)

(72) Inventor: Bong Won Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 444 days.

(21) Appl. No.: 17/374,094

(22) Filed: Jul. 13, 2021

(65) Prior Publication Data

US 2022/0281341 A1    Sep. 8, 2022

(30) Foreign Application Priority Data

Mar. 4, 2021    (KR) .................. 10-2021-0029015

(51) Int. Cl.
  *B60L 53/62*    (2019.01)
  *B60L 53/18*    (2019.01)
  *B60L 53/50*    (2019.01)
  *B60L 53/66*    (2019.01)

(52) U.S. Cl.
  CPC ............... *B60L 53/62* (2019.02); *B60L 53/18* (2019.02); *B60L 53/50* (2019.02); *B60L 53/66* (2019.02)

(58) Field of Classification Search
  CPC .. B60S 5/02; B60L 58/30; B60L 53/62; B60L 53/50; B60L 53/66; B60L 53/18
  See application file for complete search history.

(56) References Cited

U.S. PATENT DOCUMENTS

| 2018/0290561 A1 | 10/2018 | Baumgartner |
| 2020/0231045 A1 | 7/2020 | Shin et al. |
| 2021/0239272 A1* | 8/2021 | Rembutsu ............. F17C 13/025 |

FOREIGN PATENT DOCUMENTS

| DE | 102017220478 A1 | 5/2019 |
| JP | 2017211815 A * | 11/2017 |
| KR | 20200091519 A | 7/2020 |

OTHER PUBLICATIONS

WIPO English translation of JP 2017211815 (Year: 2017).*

* cited by examiner

*Primary Examiner* — Jason Holloway
*Assistant Examiner* — Christopher A Buksa
(74) *Attorney, Agent, or Firm* — Fox Rothschild LLP

(57) ABSTRACT

A charging system for a vehicle is provided. The charging system includes a charging connector, and the charging connector includes a supply nozzle that is connected to a receptacle of a supply vehicle that includes a hydrogen tank and that supplies hydrogen. A charging hose is connected with the supply nozzle at a first end thereof, and a receiving nozzle is connected to a second end of the charging hose and connected to a receptacle of a receiving vehicle that receives hydrogen from the supply vehicle.

14 Claims, 5 Drawing Sheets

CHARGING SYSTEM FOR VEHICLE

CROSS-REFERENCE TO RELATED APPLICATION

This application claims the benefit of priority to Korean Patent Application No. 10-2021-0029015, filed on Mar. 4, 2021, the entire contents of which are incorporated herein by reference.

TECHNICAL FIELD

The present disclosure relates to a charging system for a vehicle, and more specifically, to a vehicle charging system for supplying hydrogen from a supply vehicle to a receiving vehicle.

BACKGROUND

In general, in a case of fuel cell vehicles using hydrogen as a main fuel, construction of hydrogen station infrastructures is essential. However, the construction of the hydrogen station infrastructures is insufficient, compared to the penetration rate of the fuel cell vehicles. Meanwhile, in a case of electric vehicles, vehicle-to-vehicle charging technology has been developed as one example of a charging method. The vehicle-to-vehicle charging technology refers to charging a battery of one vehicle through a battery of another vehicle.

When the vehicle-to-vehicle charging technology is applied to the fuel cell vehicles, it may help to solve the problem of insufficient hydrogen station infrastructures. However, unlike the electric vehicles, the fuel cell vehicles use hydrogen. Accordingly, in the case of the fuel cell vehicles, a technology for ensuring safety of hydrogen charging and a technology for ensuring driving performance by controlling hydrogen concentration affecting the driving performance are additionally required.

SUMMARY

The present disclosure has been made to solve the above-mentioned problems occurring in the prior art while advantages achieved by the prior art are maintained intact. An aspect of the present disclosure provides a vehicle charging system for supplying hydrogen from a supply vehicle to a receiving vehicle and ensuring safety and driving performance.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a charging system for a vehicle may include a charging connector, and the charging connector may include a supply nozzle connected to a receptacle of a supply vehicle that includes a hydrogen tank and that supplies hydrogen, a charging hose connected with the supply nozzle at a first end thereof, and a receiving nozzle connected to a second end of the charging hose and connected to a receptacle of a receiving vehicle that receives hydrogen from the supply vehicle.

In an exemplary embodiment, the charging connector may further include a connector valve that is coupled to the charging hose and that opens/closes a fluid channel in the charging hose. The charging connector may further include a first receiver that is coupled to the charging hose and that obtains at least one of information about an amount of hydrogen charged in the supply vehicle and information about temperature in the tank of the supply vehicle.

In addition, the charging connector may include a second receiver that is coupled to the charging hose and that obtains at least one of information about an amount of hydrogen charged in the receiving vehicle and information about temperature in a tank of the receiving vehicle. The charging connector may further include a hydrogen concentration sensor that is coupled to the charging hose and that obtains information about hydrogen concentration in the charging hose.

In an exemplary embodiment, when a direction in which hydrogen released from the supply vehicle flows into the receiving vehicle through the charging connector is referred to as a reference direction, the connector valve may be located downstream of the hydrogen concentration sensor with respect to the reference direction. The charging system may further include a controller configured to open the connector valve, when the hydrogen concentration in the charging hose, which is obtained by the hydrogen concentration sensor, is greater than or equal to a reference concentration.

The charging system may further include a controller that is electrically connected with the supply vehicle, the receiving vehicle, and the charging connector and configured to operate the supply vehicle, the receiving vehicle, and the charging connector. In an exemplary embodiment, when the charging connector is coupled to the supply vehicle and the receiving vehicle to connect the supply vehicle and the receiving vehicle, the controller may be configured to perform a hydrogen supply step of operating the supply vehicle to open the tank of the supply vehicle and supply hydrogen in the supply vehicle to the charging connector.

When a series of processes of charging hydrogen in the receiving vehicle by introducing hydrogen released from the supply vehicle into the receiving vehicle through the charging connector are referred to as a hydrogen charging process, the controller may be configured to determine, prior to the hydrogen supply step, whether to initiate the hydrogen charging process, based on an amount of hydrogen charged in the supply vehicle. The controller may be configured to operate the supply vehicle and the receiving vehicle to perform, prior to the hydrogen supply step, a hydrogen release step of closing the tank of the supply vehicle, releasing hydrogen in an internal pipe of the supply vehicle to the outside, closing a tank of the receiving vehicle, and releasing hydrogen in an internal pipe of the receiving vehicle to the outside.

The controller may be configured to operate the charging connector to perform a hydrogen inflow step of opening the charging connector and introducing hydrogen in the charging connector into the receiving vehicle, when hydrogen concentration in the charging connector is greater than or equal to a predetermined reference concentration. In an exemplary embodiment, the controller may be configured to operate the supply vehicle, the receiving vehicle, and the charging connector to end the hydrogen inflow step when a target supply amount of hydrogen is supplied from the supply vehicle to the receiving vehicle during the hydrogen inflow step, predetermined time passes from when there is no difference between hydrogen pressure of the supply vehicle and hydrogen pressure of the receiving vehicle, or temperature in a tank of the receiving vehicle is greater than or equal to a reference temperature.

In response to determining the ending of the hydrogen inflow step, the controller may be configured to operate the supply vehicle and the receiving vehicle to close the tanks of the supply vehicle and the receiving vehicle and release hydrogen in internal pipes of the supply vehicle and the receiving vehicle to the outside. The controller may be configured to operate the supply vehicle to perform a purge step of closing the tank of the supply vehicle, releasing hydrogen in an internal pipe of the supply vehicle to the outside, and opening the tank of the supply vehicle, when hydrogen concentration in the charging connector is less than a predetemined reference concentration after the hydrogen supply step. In an exemplary embodiment, the supply nozzle may open a check valve of the receptacle of the supply vehicle when connected to the receptacle of the supply vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
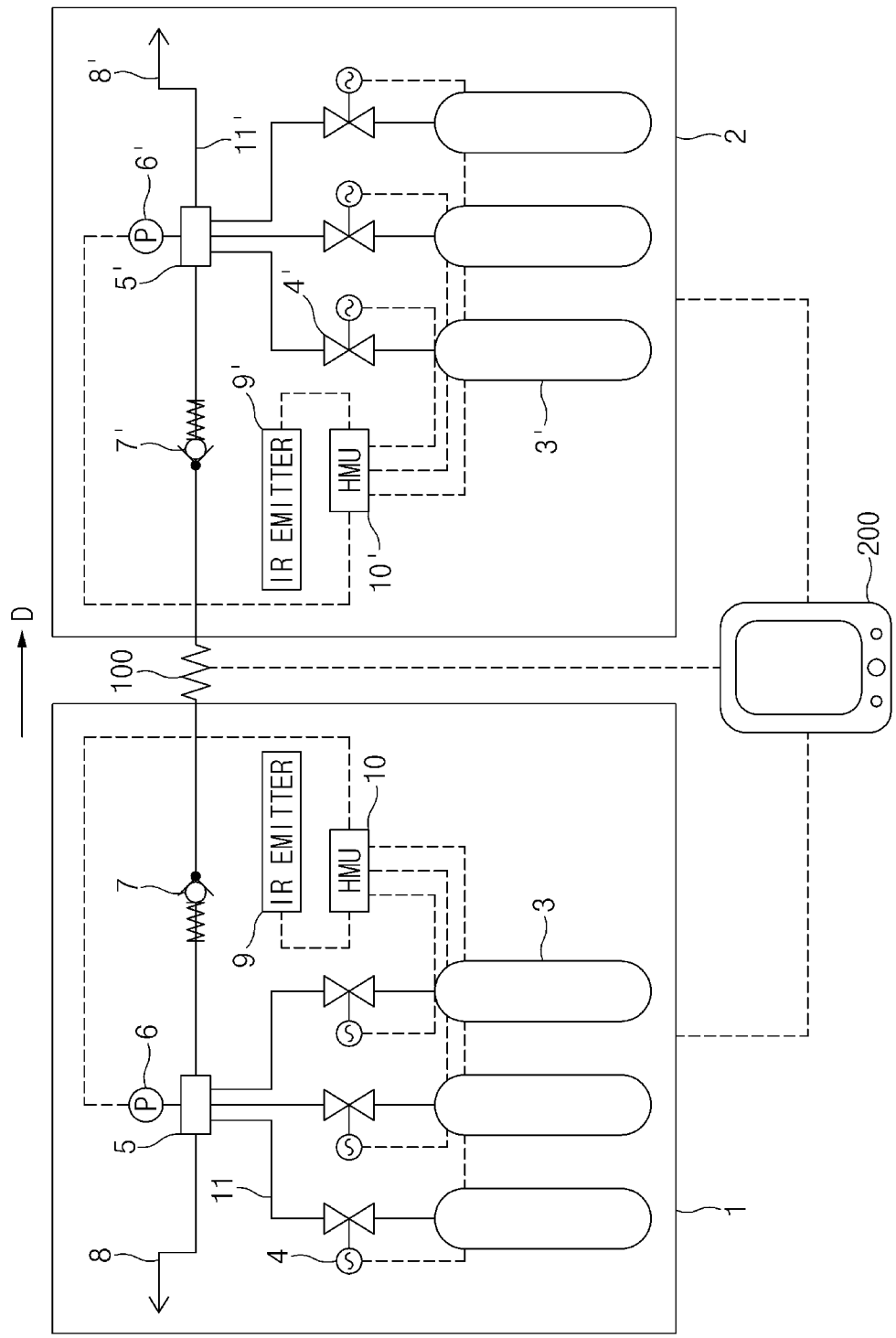
FIG. 1 is a view conceptually illustrating a charging system for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

FIG. 1 is a view conceptually illustrating a charging system for a vehicle according to an exemplary embodiment of the present disclosure. Dotted lines in FIG. 1 indicate electrical connections. The electrical connections may include both wired connections and wireless connections.

The charging system for the vehicle according to the exemplary embodiment of the present disclosure is a charging system capable of supplying fuel of a supply vehicle 1 from the supply vehicle 1 to a receiving vehicle 2. In an exemplary embodiment, the fuel may be hydrogen. Hereinafter, it will be exemplified that the fuel is hydrogen. However, without being limited thereto, the fuel may be changed within a range that is easy for those skilled in the art. Prior to description of the charging system for the vehicle according to the exemplary embodiment of the present disclosure, one example of the supply vehicle 1 and the receiving vehicle 2, to which the charging system for the vehicle is able to be applied, will hereinafter be described.

The supply vehicle 1 and the receiving vehicle 2 may include tanks 3 and 3' for storing high-pressure hydrogen, respectively. The tanks 3 and 3' may be equipped with tank valves 4 and 4' for entrance/exit of the hydrogen. For example, the tank valves 4 and 4' may be, but are not limited to, solenoid valves that may be opened and closed by electromagnetic signals. Meanwhile, the tank valves 4 and 4' may be equipped with temperature sensors and may be configured to measure temperatures in the tanks 3 and 3'.

The supply vehicle 1 and the receiving vehicle 2 may include receptacles 7 and 7' that function as passages through which the hydrogen is introduced or released. The receptacles 7 and 7' may include check valves 12 (FIG. 3) for preventing a reverse flow of the hydrogen inside. The hydrogen injected through the receptacles 7 and 7' may be distributed to the tanks 3 and 3' through manifolds 5 and 5' connected to the tanks 3 and 3' and may be stored in the tanks 3 and 3'. The manifolds 5 and 5' may be equipped with pressure sensors 6 and 6' for measuring pressures in the tanks 3 and 3'. When hydrogen is supplied to the vehicles later, the hydrogen may be supplied to the vehicles from the tanks 3 and 3' through the manifolds 5 and 5' and hydrogen supply pipes 8 and 8'. The hydrogen supply pipes 8 and 8' may be connected with fuel cell stacks in the vehicles.

Furthermore, the hydrogen supply pipes 8 and 8' may be fluidly connected with the outsides of the vehicles. More specifically, the hydrogen supply pipes 8 and 8' may be fluidly connected with the outsides of the vehicles through the fuel cell stacks. Hydrogen gases released from the tanks 3 and 3' may sequentially pass through the hydrogen supply pipes 8 and 8', hydrogen cut-off valves, hydrogen supply valves, drain valves, and purge valves and may be released to the outsides of the vehicles. The hydrogen cut-off valves, the hydrogen supply valves, the drain valves, and the purge valves are components equipped in general fuel cell vehicles. Therefore, detailed descriptions thereabout will be omitted.

The supply vehicle 1 and the receiving vehicle 2 may include internal pipes 11 and 11' designed to withstand high pressure. Furthermore, the above-described parts may be disposed in-line with the internal pipes 11 and 11'. The supply vehicle 1 and the receiving vehicle 2 may include IR emitters 9 and 9' and hydrogen storage system manage units (HMUs) 10 and 10'. The IR emitters 9 and 9' may be configured to transmit information, such as the amounts of hydrogen charged in the supply vehicle 1 and the receiving vehicle 2, the temperatures of the tanks 3 and 3', and the like, to the outsides of the supply vehicle 1 and the receiving vehicle 2.

The HMUs 10 and 10' may be electrically connected with the tank valves 4 and 4' and may be configured to control opening/closing of the tank valves 4 and 4'. Furthermore, the HMUs 10 and 10' may be configured to calculate the amounts of hydrogen charged in the supply vehicle 1 and the receiving vehicle 2, based on the temperatures of the tanks 3 and 3' measured by the temperature sensors of the tank valves 4 and 4' and the pressures in the tanks 3 and 3' measured by the pressure sensors 6 and 6' and may be configured to transmit the information to the outsides of the supply vehicle 1 and the receiving vehicle 2 through the IR emitters 9 and 9'. For example, when a controller 200 to be described below operates the supply vehicle 1 and the receiving vehicle 2 to open or close the tank valves 4 and 4', it may indicate that the controller 200 transmits signals to the HMUs 10 and 10' of the supply vehicle 1 and the receiving vehicle 2 to cause the HMUs 10 and 10' of the supply vehicle 1 and the receiving vehicle 2 to open or close the tank valves 4 and 4' of the supply vehicle 1 and the receiving vehicle 2.

Detailed configurations of the supply vehicle 1 and the receiving vehicle 2 are the same as those of general fuel cell vehicles. Therefore, detailed contents will be omitted. Hereinafter, based on the above-described contents, the charging system for the vehicle according to the exemplary embodiment of the present disclosure will be described in detail.

Charging Connector 100

Figure 2:
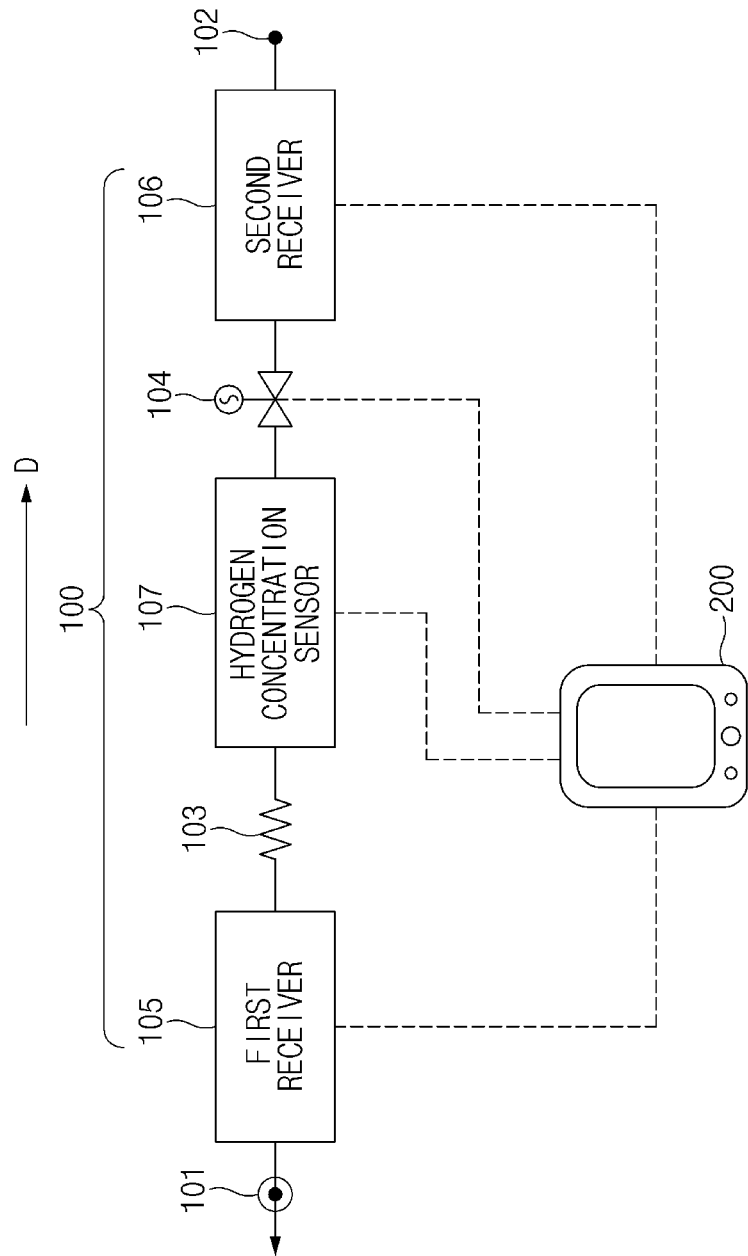
FIG. 2 is a view conceptually illustrating a charging connector of the charging system for the vehicle according to an exemplary embodiment of the present disclosure.

FIG. 2 is a view conceptually illustrating the charging connector of the charging system for the vehicle according to an exemplary embodiment of the present disclosure. Dotted lines in FIG. 2 may indicate electrical connections. The electrical connections may include both wired connections and wireless connections. The charging system for the vehicle according to the exemplary embodiment of the present disclosure may include the charging connector 100. As illustrated in FIG. 2, the charging connector 100 may include a supply nozzle 101, a charging hose 103, and a receiving nozzle 102.

Figure 3:
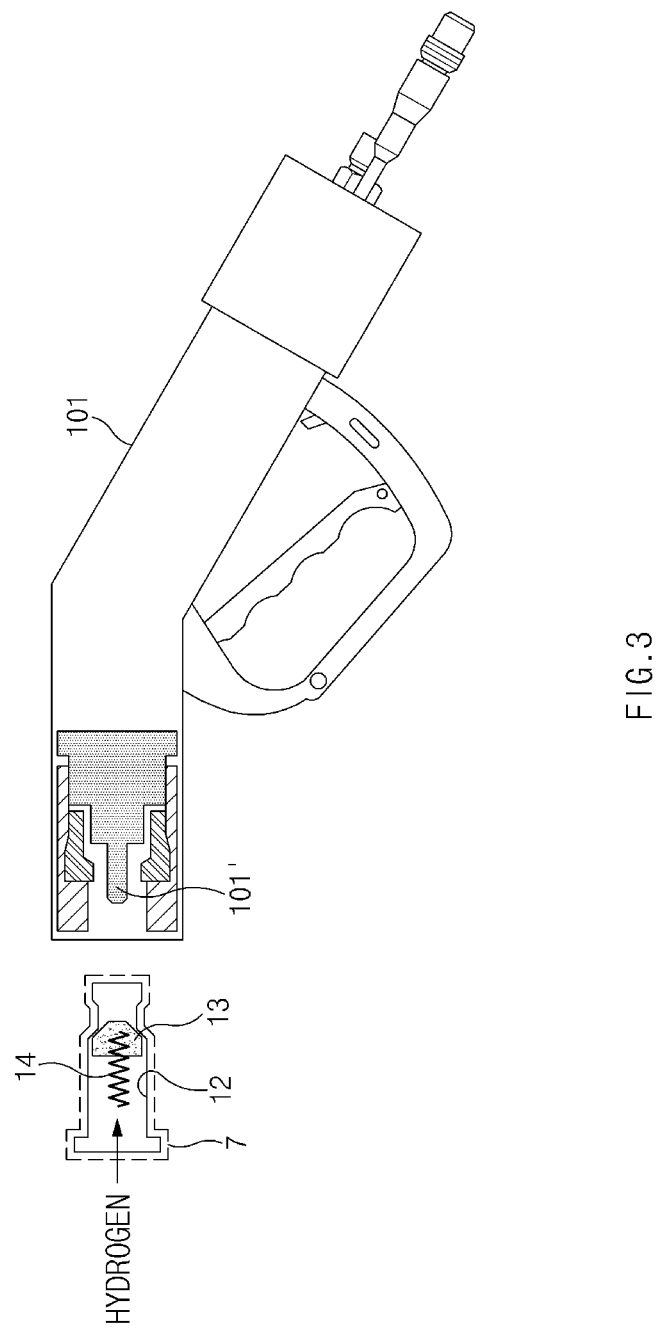
FIG. 3 is a view conceptually illustrating one example of a supply nozzle and a receptacle of a supply vehicle.
Figure 4:
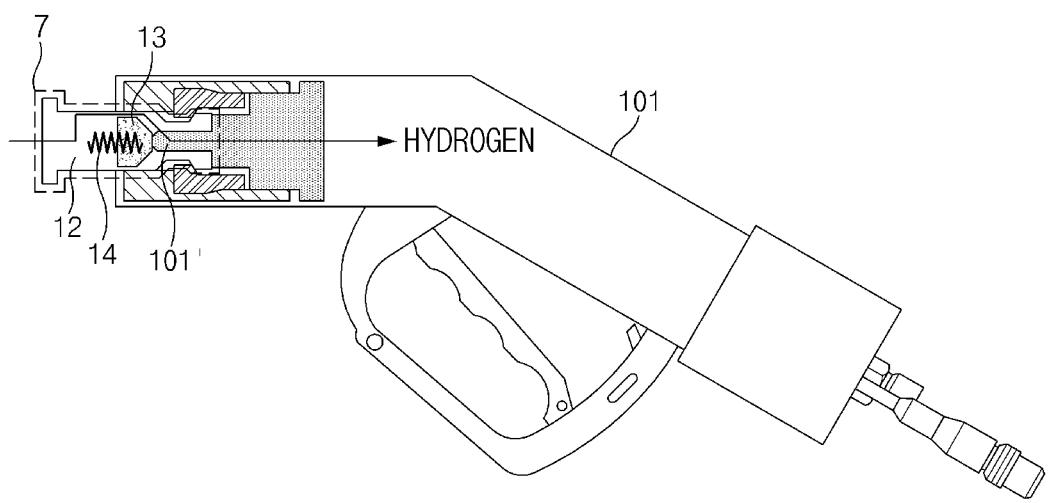
FIG. 4 is a view conceptually illustrating one example of a case in which the supply nozzle is connected to the receptacle of the supply vehicle.

The supply nozzle 101 may be configured to be connected to the receptacle 7 of the supply vehicle 1. FIG. 3 is a view conceptually illustrating one example of the supply nozzle and the receptacle of the supply vehicle. The supply nozzle 101 may open the check valve 12 of the receptacle 7 of the supply vehicle 1 when connected to the receptacle 7 of the supply vehicle 1. FIG. 4 is a view conceptually illustrating one example of a case in which the supply nozzle is connected to the receptacle of the supply vehicle. For example, the check valve 12 of the supply vehicle 1 may include a valve disk 13 pressed only in one direction (e.g., a first direction) to allow for introduction of hydrogen from the outside and to prevent release of the hydrogen to the outside and an elastic member 14 pressing the valve disk 13. The elastic member 14 may be a coil spring.

The one direction may be the rightward direction with respect to FIGS. 3 and 4. As illustrated in FIG. 4, the supply nozzle 101 may be inserted into the receptacle 7 of the supply vehicle 1 and may push the valve disk 13 in an opposite direction (e.g., a second direction) to the one direction, that is, to the left with respect to FIGS. 3 and 4 to open the check valve 12. More specifically, when a tip 101' of the supply nozzle 101 pushes the valve disk 13 in the opposite direction to the one or first direction, the check valve 12 may be opened, and the hydrogen may be released from the check valve 12.

Meanwhile, as illustrated in FIG. 4, the open check valve 12 may be fluidly connected with the supply nozzle 101, and therefore the hydrogen of the supply vehicle 1 may be released to the supply nozzle 101. The charging hose 103 may be connected with the supply nozzle 101 at a first end thereof. The receiving nozzle 102 may be connected to an opposite or second end of the charging hose 103. Furthermore, the receiving nozzle 102 may be configured to be connected to the receptacle 7' (FIG. 1) of the receiving vehicle 2 (FIG. 1).

According to the present disclosure, the hydrogen of the supply vehicle 1 may be supplied to the receiving vehicle 2 through the charging connector 100 that connects the supply vehicle 1 and the receiving vehicle 2. Accordingly, when the receiving vehicle 2 is deficient in hydrogen, the receiving vehicle 2 may be configured to receive hydrogen from the supply vehicle 1, and thus a problem such as vehicle stop due to a lack of fuel may be solved through the supply vehicle 1 even when there is no hydrogen station nearby.

Connector Valve 104

The charging connector 100 may further include the connector valve 104. The connector valve 104 may be connected to the charging hose 103 and may be configured to open/close a fluid channel in the charging hose 103. For example, when the connector valve 104 is closed, the fluid channel in the charging hose 103 may be closed, and when the connector valve 104 is opened, the fluid channel in the charging hose 03 may be opened. Opening/closing of the connector valve 104 may be determined based on various conditions. Hereinafter, these contents will be described in detail.

Controller 200

The charging system for the vehicle according to the exemplary embodiment of the present disclosure may further include the controller 200. As illustrated in FIG. 1, the controller 200 may be electrically connected with the supply vehicle 1, the receiving vehicle 2, and the charging connector 100 and may be configured to operate the supply vehicle 1, the receiving vehicle 2, and the charging connector 100.

For example, the controller 200 may be connected with the connector valve 104 and may be configured to operate the connector valve 104 to adjust an open/closed state of the fluid channel in the charging hose 103. The controller 200 may include a processor and a memory. The processor may include a microprocessor such as a field programmable gate array (FPGA), an application specific integrated circuit (ASIC), a central processing unit (CPU), or the like. The memory may be configured to store control instructions based on which the processor generates instructions for determining whether to open/close the connector valve 104. The memory may be a data store such as a hard disk drive (HDD), a solid state drive (SSD), a volatile medium, a non-volatile medium, or the like.

For example, the controller 200 may be implemented in a form of installing an application in a mobile device such as a smart phone. Alternatively, the controller 200 may be a separate terminal. In this case, the controller 200 has to be located within a predetermined distance from the vehicle. In another case, the controller 200 may be a terminal equipped in one of the supply vehicle 1 and the receiving vehicle 2.

When the charging connector 100 is coupled to the supply vehicle 1 and the receiving vehicle 2 to connect the supply vehicle 1 and the receiving vehicle 2, the controller 200 may be configured to operate the supply vehicle 1 to open the tank 3 of the supply vehicle 1 and supply hydrogen in the supply vehicle 1 into the charging connector 100. When the charging connector 100 is coupled to the supply vehicle 1 and the receiving vehicle 2 to connect the supply vehicle 1 and the receiving vehicle 2, the supply nozzle 101 (FIG. 2) may be connected to the receptacle 7 (FIG. 1) of the supply vehicle 1 (FIG. 1) and the receiving nozzle 102 (FIG. 2) may be connected to the receptacle 7' (FIG. 1) of the receiving vehicle 2 (FIG. 1).

First Receiver 105

As illustrated in FIG. 2, the charging connector 100 may further include the first receiver 105. The first receiver 105 may be coupled to the charging hose 103 and may be configured to obtain at least one of information about the amount of hydrogen charged in the supply vehicle 1 (FIG. 1) and information about the temperature in the tank 3 of the supply vehicle 1. More specifically, the first receiver 105 may be configured to obtain, from the IR emitter 9 of the supply vehicle 1 (FIG. 1), at least one of the information about the amount of hydrogen charged in the supply vehicle 1 and the information about the temperature in the tank 3 of the supply vehicle 1. The first receiver 105 may be configured to transfer the obtained information to the controller 200.

The controller 200 may be configured to determine whether to open/close the fluid channel in the charging hose 103, by operating the connector valve 104 (FIG. 2) based on at least one of the information about the amount of hydrogen charged in the supply vehicle 1 (FIG. 1) and the information about the temperature in the tank 3 of the supply vehicle 1. In another example, the controller 200 may be configured to obtain, from the IR emitter 9 of the supply vehicle 1 (FIG. 1), at least one of the information about the amount of hydrogen charged in the supply vehicle 1 and the information about the temperature in the tank 3 of the supply vehicle 1. In this case, the first receiver 105 may not be included in the charging connector 100.

Second Receiver 106

As illustrated in FIG. 2, the charging connector 100 may further include the second receiver 106. The second receiver 106 may be coupled to the charging hose 103 and may be configured to obtain at least one of information about the amount of hydrogen charged in the receiving vehicle 2 (FIG. 1) and information about the temperature in the tank 3' of the receiving vehicle 2. More specifically, the second receiver 106 may be configured to obtain, from the IR emitter 9' of the receiving vehicle 2 (FIG. 1), at least one of the information about the amount of hydrogen charged in the receiving vehicle 2 and the information about the temperature in the tank 3' of the receiving vehicle 2. The second receiver 106 may be configured to transfer the obtained information to the controller 200.

Furthermore, the controller 200 may be configured to determine whether to open/close the fluid channel in the charging hose 103, by operating the connector valve 104 (FIG. 2) based on at least one of the information about the amount of hydrogen charged in the receiving vehicle 2 (FIG. 1) and the information about the temperature in the tank 3' of the receiving vehicle 2. In another example, the controller 200 may be configured to obtain, from the IR emitter 9' of the receiving vehicle 2 (FIG. 1), at least one of the information about the amount of hydrogen charged in the receiving vehicle 2 and the information about the temperature in the tank 3' of the receiving vehicle 2. In this case, the second receiver 106 may not be included in the charging connector 100.

Hydrogen Concentration Sensor 107

As illustrated in FIG. 2, the charging connector 100 may further include the hydrogen concentration sensor 107. The hydrogen concentration sensor 107 may be coupled to the charging hose 103 and may be configured to obtain information about hydrogen concentration in the charging hose 103.

As illustrated in FIG. 2, the connector valve 104 may be located downstream of the hydrogen concentration sensor 107 with respect to a reference direction D. The reference direction D may be a direction in which hydrogen released from the supply vehicle 1 (FIG. 1) flows into the receiving vehicle 2 through the charging connector 100. For example, the hydrogen concentration sensor 107 may be configured to obtain information about hydrogen concentration, and the controller 200 may be configured to determine whether to open/close the fluid channel in the charging hose 103, by operating the connector valve 104 based on the obtained information. More specifically, when the hydrogen concentration in the charging hose 103, which is obtained by the hydrogen concentration sensor 107, is greater than or equal to a reference concentration, the controller 200 may be configured to open the connector valve 104. For example, the reference concentration may be about 99.97%.

When the charging connector 100 is coupled to the supply vehicle 1 and the receiving vehicle 2 to connect the supply vehicle 1 and the receiving vehicle 2, a mixture of hydrogen and air may be present in the charging hose 103. In this case, when the connector valve 104 is opened, low-concentration hydrogen may be introduced into the receiving vehicle 2, which may lead to deterioration in driving performance. According to the charging system for the vehicle according to the exemplary embodiment of the present disclosure, the connector valve 104 may be opened when the concentration of hydrogen is high. Accordingly, high-concentration hydrogen may be supplied to the receiving vehicle 2, and thus driving performance of the receiving vehicle 2 may be ensured.

Charging Process

Figure 5:
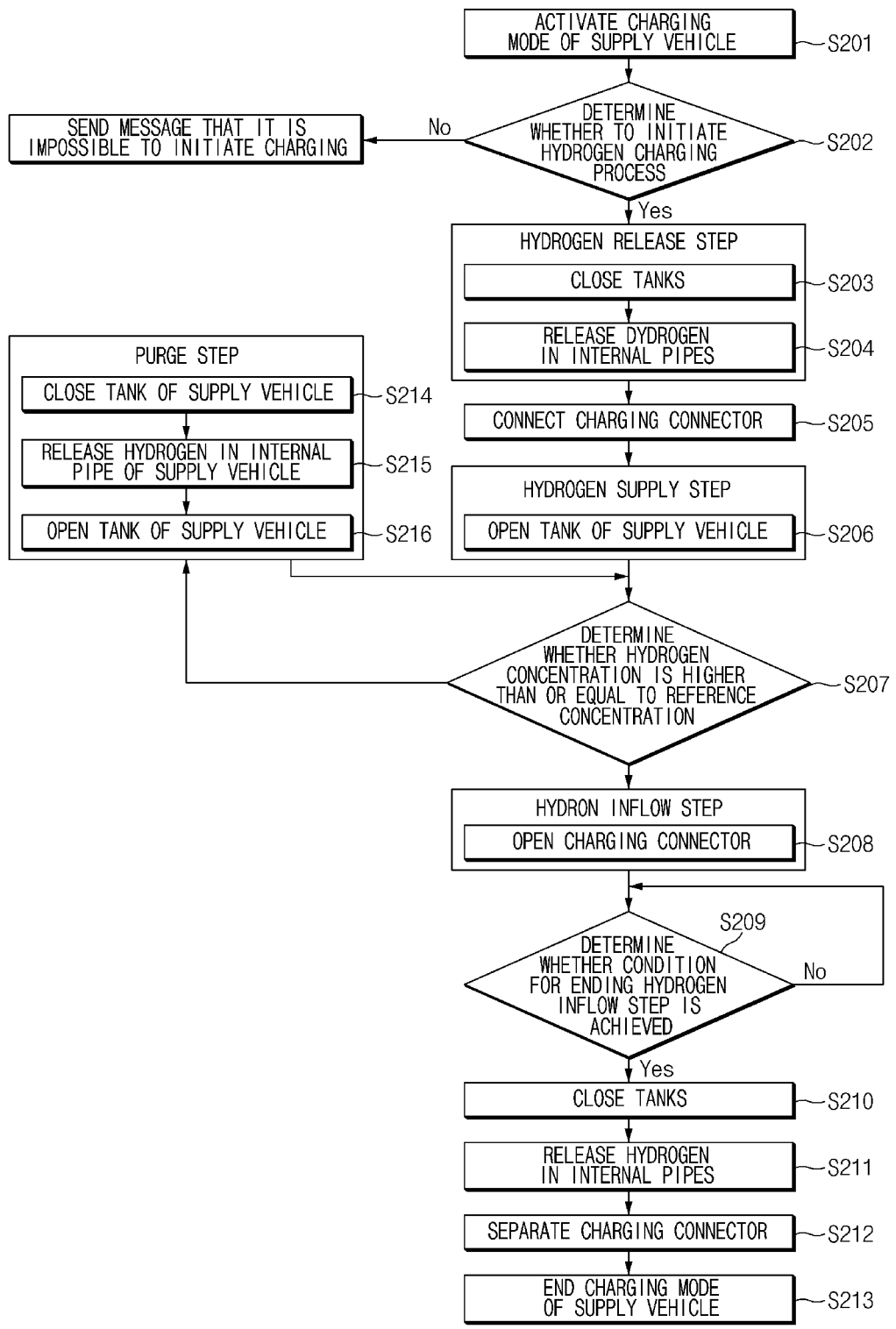
FIG. 5 is a flowchart illustrating a process of injecting hydrogen from a supply vehicle to a receiving vehicle through the charging system for the vehicle according to an exemplary embodiment of the present disclosure.

FIG. 5 is a flowchart illustrating a process of injecting hydrogen from a supply vehicle to a receiving vehicle through the charging system for the vehicle according to an exemplary embodiment of the present disclosure. Hereinafter, a process of injecting hydrogen from the supply vehicle 1 (FIG. 1) to the receiving vehicle 2 (FIG. 1) through the charging system for the vehicle according to the exemplary embodiment of the present disclosure will be described in detail. For a better understanding, FIGS. 1 and 2 may be referred to.

First, a charging mode of the supply vehicle 1 may be activated for initiation of a hydrogen charging process (S201). When the charging mode is activated, starting of the supply vehicle 1 may be ended. Furthermore, when the charging mode is activated, a hydrogen cut-off valve connected to a fuel cell stack may be closed. At this time, the controller 200 may be configured to identify the amount of hydrogen charged in the supply vehicle 1 and perform step S202 of determining whether to initiate the hydrogen charging process, based on the amount of hydrogen charged in the supply vehicle 1. For example, when the amount of hydrogen charged in the supply vehicle 1 is greater than or equal to a reference amount, the controller 200 may be configured to determine to initiate the hydrogen charging process. At this time, the reference amount may be about 30% of the amount of hydrogen that may be charged in the supply vehicle 1 to the maximum.

Meanwhile, at this time, the controller 200 may be configured to identify the amounts of hydrogen charged in the supply vehicle 1 and the receiving vehicle 2 and perform step S202 of determining whether to initiate the hydrogen charging process, based on the amounts of hydrogen charged in the supply vehicle 1 and the receiving vehicle 2. At this time, the reference amount may be an amount of hydrogen by which the supply vehicle 1 may travel a predetermined distance after the supply vehicle 1 supplies hydrogen to the receiving vehicle 2 to the maximum. The predetermined distance may be about 100 km. However, the predetermined distance is not limited to 100 km and may be one example of the distance to a hydrogen station.

In response to determining that the amount of hydrogen charged in the supply vehicle 1 is less than the reference amount, the controller 200 may be configured to determine that the supply vehicle 1 is deficient in hydrogen and may transmit, to a user, a message that it is impossible to initiate the hydrogen charging process. When another condition for initiation of the hydrogen charging process is satisfied, that is, when the amount of hydrogen charged in the supply vehicle 1 is greater than the amount of hydrogen charged in the receiving vehicle 2, the hydrogen charging process may be initiated. When the amount of hydrogen charged in the supply vehicle 1 is less than the amount of hydrogen charged in the receiving vehicle 2, the hydrogen in the supply vehicle 1 may not be introduced into the receiving vehicle 2 due to a pressure difference. Accordingly, in response to determining that the amount of hydrogen charged in the supply vehicle 1 is less than the amount of hydrogen charged in the receiving vehicle 2, the controller 200 may be configured to transmit, to the user, a message that it is impossible to initiate the hydrogen charging process.

Initiation of the hydrogen charging process will be described in detail with an example. For convenience of description, it may be assumed that the supply vehicle 1 and the receiving vehicle 2 have the same tank capacity. For example, it may be assumed that the tank 3 of the supply vehicle 1 is filled with an amount of hydrogen to travel 250 km and the tank 3' of the receiving vehicle 2 is filled with an amount of hydrogen to travel 50 km.

In this case, the hydrogen charging process may be initiated since the tank 3 of the supply vehicle 1 is filled with an amount of hydrogen to travel about 250 km and the amount of hydrogen charged in the supply vehicle 1 is greater than the amount of hydrogen charged in the receiving vehicle 2. Specifically, when the supply vehicle 1 supplies hydrogen to the receiving vehicle 2 to the maximum, the tank 3 of the supply vehicle 1 and the tank 3' of the receiving vehicle 2 may be filled with an amount of hydrogen to travel about 150 km. Accordingly, after the supply vehicle 1 supplies hydrogen to the receiving vehicle 2 to the maximum, the supply vehicle 1 may travel about 100 km or more.

Second, the controller 200 may be configured to operate the supply vehicle 1 (FIG. 1) and the receiving vehicle 2 (FIG. 1) to perform a hydrogen release step S203 and S204. The hydrogen release step S203 and S204 may be a step of closing the tanks 3 and 3' of the supply vehicle 1 and the receiving vehicle 2 (S203) and releasing, to the outside, hydrogen in the internal pipe 11 of the supply vehicle 1 and hydrogen in the internal pipe 11' of the receiving vehicle 2 (S204). More specifically, the controller 200 may be configured to close the tank valves 4 and 4' of the supply vehicle 1 and the receiving vehicle 2 and release hydrogen to the outside through the hydrogen supply pipes 8 and 8'.

The hydrogen release step S203 and S204 may be understood as a process of releasing high pressures formed in the supply vehicle 1 and the receiving vehicle 2. In the internal pipes 11 and 11' of the general fuel cell vehicles, the pressure of hydrogen may be very high. Accordingly, it may be dangerous to open the receptacles 7 and 7' of the fuel cell vehicles without releasing the high pressure. The high pressures in the supply vehicle 1 and the receiving vehicle 2 may be released through the hydrogen release step S203 and S204. According to the present disclosure, the charging connector 100 may be connected after safety is ensured, and thus safety may be ensured in the hydrogen charging process.

Third, the supply nozzle 101 of the charging connector 100 is connected to the receptacle 7 of the supply vehicle 1, and the receiving nozzle 102 is connected to the receptacle 7' of the receiving vehicle 2 (S205). Fourth, the controller 200 may be configured to operate the supply vehicle 1 to perform a hydrogen supply step S206. The hydrogen supply step S206 may be a step of operating the supply vehicle 1 to open the tank 3 of the supply vehicle 1 and supply hydrogen in the supply vehicle 1 to the charging connector 100. However, at this time, the hydrogen supplied from the supply vehicle 1 is not introduced into the receiving vehicle 2 since the fluid channel in the charging hose 103 is blocked by the connector valve 104 of the charging connector 100.

Fifth, the controller 200 may be configured to operate the charging connector 100 to perform a hydrogen inflow step S208. The hydrogen inflow step S208 may be a step of determining whether hydrogen concentration in the charging connector 100 is greater than or equal to a predetermined reference concentration (S207) and opening the charging connector 100 and introducing hydrogen in the charging connector 100 into the receiving vehicle 2, when the hydrogen concentration is greater than or equal to the predetermined reference concentration. At this time, the reference concentration may be about 99.97%.

The hydrogen concentration may be less than the reference concentration. In this case, the controller 200 may be configured to operate the supply vehicle 1 to perform a purge step S214, S215, and S216. The purge step S214, S215, and S216 may be a step of closing the tank 3 of the supply vehicle 1 (S214), releasing hydrogen in the internal pipe 11 of the supply vehicle 1 to the outside (S215), and opening the tank 3 of the supply vehicle 1 (S216), when the hydrogen concentration in the charging connector 100 is less than the reference concentration after the hydrogen supply step S206. The release of the hydrogen to the outside may be performed through the same process as the hydrogen release step S203 and S204 described above. Through this process, the concentration of hydrogen in the internal pipes 11 of the supply vehicle 1 may be increased.

Sixth, the controller 200 may be configured to determine whether a target supply amount of hydrogen is achieved, whether predetermined time passes from when there is no difference in hydrogen pressure between the supply vehicle 1 and the receiving vehicle 2 during the hydrogen inflow step S208, or whether the temperature in the tank 3' of the receiving vehicle 2 is greater than or equal to a reference temperature (S209). When the predetermined time passes from when there is no difference in hydrogen pressure between the supply vehicle 1 and the receiving vehicle 2, or the temperature in the tank 3' of the receiving vehicle 2 is greater than or equal to the reference temperature, the controller 200 may be configured to operate the supply vehicle 1, the receiving vehicle 2, and the charging connector 100 to end the hydrogen inflow step S208. In other words, the controller 200 may be configured to determine whether a condition for ending the hydrogen inflow step S208 is achieved and based on the determination, may be configured to determine whether to end the hydrogen inflow step S208.

More specifically, when the target supply amount of hydrogen is moved from the supply vehicle 1 to the receiving vehicle 2, the controller 200 may be configured to operate the supply vehicle 1, the receiving vehicle 2, and the charging connector 100 to end the hydrogen inflow step S208. The target supply amount of hydrogen may be set by the user. However, the target supply amount of hydrogen has to be less than the difference between the total amount of hydrogen charged in the supply vehicle 1 and the reference amount and may be less than or equal to the average of the total amount of hydrogen charged in the supply vehicle 1 and the total amount of hydrogen charged in the receiving vehicle 2.

Alternatively, when the predetermined time passes from when there is no difference between the hydrogen pressure of the supply vehicle 1 measured by the pressure sensor 6 of the supply vehicle 1 and the hydrogen pressure of the receiving vehicle 2 measured by the pressure sensor 6' of the receiving vehicle 2, the controller 200 may be configured to operate the supply vehicle 1, the receiving vehicle 2, and the charging connector 100 to end the hydrogen inflow step S208. The predetermined time may be about 20 seconds. However, this is an exemplary value, and the predetermined time may be changed as needed.

When the temperature in the tank 3 of the supply vehicle 1 that is measured by the tank valve 4 of the supply vehicle 1 is about −40° C. or less, or the temperature in the tank 3' of the receiving vehicle 2 that is measured by the tank valve 4' of the receiving vehicle 2 is about 85° C. or greater, the controller 200 may be configured to operate the supply vehicle 1, the receiving vehicle 2, and the charging connector 100 to end the hydrogen inflow step S208. However, the aforementioned temperatures are exemplary values and may be changed as needed. The reference pressure and the reference temperature may be set based on charging efficiency and system protection.

Seventh, when ending of the hydrogen inflow step S208 is determined, the controller 200 may be configured to operate the supply vehicle 1 and the receiving vehicle 2 to close the tanks 3 and 3' of the supply vehicle 1 and the receiving vehicle 2 (S210) and release hydrogen in the internal pipes 11 and 11' of the supply vehicle 1 and the receiving vehicle 2 to the outside (S211). This process may be understood as a process of ensuring safety by releasing high pressures in the internal pipes 11 and 11' of the supply vehicle 1 and the receiving vehicle 2 before separating the supply nozzle 101 and the receiving nozzle 102 from the receptacles 7 and 7' of the supply vehicle 1 and the receiving vehicle 2. This process may be understood as a process similar to the hydrogen release step S203 and S204 described above. Last, the supply nozzle 101 and the receiving nozzle 102 may be separated from the supply vehicle 1 and the receiving vehicle 2 (S212), and the activated charging mode may be ended (S213). When the charging mode is ended, the vehicle may be restarted.

According to the present disclosure, hydrogen of the supply vehicle may be supplied to the receiving vehicle through the charging connector connecting the supply vehicle and the receiving vehicle. Furthermore, according to the present disclosure, the connector valve may be opened when the concentration of hydrogen is high. Accordingly, high-concentration hydrogen may be supplied to the receiving vehicle, and thus driving performance of the receiving vehicle may be ensured. In addition, according to the present disclosure, the charging connector may be connected after the safety of the supply vehicle and the receiving vehicle against high-pressure hydrogen is ensured. Accordingly, safety may be ensured in a charging process.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A charging system for a vehicle, comprising:
 a charging connector,
 wherein the charging connector includes:
 a supply nozzle configured to be connected to a receptacle of a supply vehicle configured to supply hydrogen, wherein the supply vehicle includes a hydrogen tank;
 a charging hose connected with the supply nozzle at a first end thereof;
 a receiving nozzle connected to a second end of the charging hose and connected to a receptacle of a receiving vehicle configured to receive hydrogen from the supply vehicle; and a controller electrically connected with the supply vehicle, the receiving vehicle, and the charging connector and configured to operate the supply vehicle, the receiving vehicle, and the charging connector, wherein the controller is configured to operate the charging connector to perform a hydrogen inflow step of opening the charging connector and introducing hydrogen in the charging connector into the receiving vehicle, in response to determining that hydrogen concentration in the charging connector is greater than or equal to a predetermined reference concentration.

2. The charging system of claim 1, wherein the charging connector further includes a connector valve coupled to the charging hose and configured to open/close a fluid channel in the charging hose.

3. The charging system of claim 2, wherein the charging connector further includes a first receiver coupled to the charging hose and configured to obtain at least one of information about an amount of hydrogen charged in the supply vehicle and information about temperature in the tank of the supply vehicle.

4. The charging system of claim 2, wherein the charging connector further includes a second receiver coupled to the charging hose and configured to obtain at least one of information about an amount of hydrogen charged in the receiving vehicle or information about temperature in a tank of the receiving vehicle.

5. The charging system of claim 2, wherein the charging connector further includes a hydrogen concentration sensor coupled to the charging hose and configured to obtain information about hydrogen concentration in the charging hose.

6. The charging system of claim 5, wherein when a direction in which hydrogen released from the supply vehicle flows into the receiving vehicle through the charging connector is a reference direction, the connector valve is located downstream of the hydrogen concentration sensor with respect to the reference direction.

7. The charging system of claim 5, wherein the controller is configured to open the connector valve, in response to determining that the hydrogen concentration in the charging hose, which is obtained by the hydrogen concentration sensor, is greater than or equal to a reference concentration.

8. The charging system of claim 1, wherein when the charging connector is coupled to the supply vehicle and the receiving vehicle to connect the supply vehicle and the receiving vehicle, the controller is configured to perform a hydrogen supply step of operating the supply vehicle to open the tank of the supply vehicle and supply hydrogen in the supply vehicle to the charging connector.

9. The charging system of claim 8, wherein when a series of processes of charging hydrogen in the receiving vehicle by introducing hydrogen released from the supply vehicle into the receiving vehicle through the charging connector are together a hydrogen charging process, the controller is configured to determine, prior to the hydrogen supply step, whether to initiate the hydrogen charging process, based on an amount of hydrogen charged in the supply vehicle.

10. The charging system of claim 1, wherein the controller is configured to operate the supply vehicle, the receiving vehicle, and the charging connector to end the hydrogen inflow step when a target supply amount of hydrogen is supplied from the supply vehicle to the receiving vehicle during the hydrogen inflow step, predetermined time passes from when there is no difference between hydrogen pressure of the supply vehicle and hydrogen pressure of the receiving vehicle, or temperature in a tank of the receiving vehicle is greater than or equal to a reference temperature.

11. The charging system of claim 10, wherein when ending of the hydrogen inflow step is determined, the controller is configured to operate the supply vehicle and the receiving vehicle to close the tanks of the supply vehicle and the receiving vehicle and release hydrogen in internal pipes of the supply vehicle and the receiving vehicle to the outside.

12. The charging system of claim 1, wherein the supply nozzle opens a check valve of the receptacle of the supply vehicle when connected to the receptacle of the supply vehicle.

13. A charging system for a vehicle, comprising:
a charging connector,
wherein the charging connector includes:
a supply nozzle configured to be connected to a receptacle of a supply vehicle configured to supply hydrogen, wherein the supply vehicle includes a hydrogen tank;
a charging hose connected with the supply nozzle at a first end thereof;
a receiving nozzle connected to a second end of the charging hose and connected to a receptacle of a receiving vehicle configured to receive hydrogen from the supply vehicle; and
a controller electrically connected with the supply vehicle, the receiving vehicle, and the charging connector and configured to operate the supply vehicle, the receiving vehicle, and the charging connector,
wherein when the charging connector is coupled to the supply vehicle and the receiving vehicle to connect the supply vehicle and the receiving vehicle, the controller is configured to perform a hydrogen supply step of operating the supply vehicle to open the tank of the supply vehicle and supply hydrogen in the supply vehicle to the charging connector, and
wherein the controller is configured to operate the supply vehicle and the receiving vehicle to perform, prior to the hydrogen supply step, a hydrogen release step of closing the tank of the supply vehicle, releasing hydrogen in an internal pipe of the supply vehicle to the outside, closing a tank of the receiving vehicle, and releasing hydrogen in an internal pipe of the receiving vehicle to the outside.

14. A charging system for a vehicle, comprising:
a charging connector,
wherein the charging connector includes:
a supply nozzle configured to be connected to a receptacle of a supply vehicle configured to supply hydrogen, wherein the supply vehicle includes a hydrogen tank;
a charging hose connected with the supply nozzle at a first end thereof;
a receiving nozzle connected to a second end of the charging hose and connected to a receptacle of a receiving vehicle configured to receive hydrogen from the supply vehicle; and
a controller electrically connected with the supply vehicle, the receiving vehicle, and the charging connector and configured to operate the supply vehicle, the receiving vehicle, and the charging connector,
wherein when the charging connector is coupled to the supply vehicle and the receiving vehicle to connect the supply vehicle and the receiving vehicle, the controller is configured to perform a hydrogen supply step of operating the supply vehicle to open the tank of the supply vehicle and supply hydrogen in the supply vehicle to the charging connector, and wherein the controller is configured to operate the supply vehicle to perform a purge step of closing the tank of the supply vehicle, releasing hydrogen in an internal pipe of the supply vehicle to the outside, and opening the tank of the supply vehicle, in response to determining that hydrogen concentration in the charging connector is less than a predetermined reference concentration after the hydrogen supply step.

* * * * *